(12) United States Patent
Anderson et al.

(10) Patent No.: US 6,874,824 B2
(45) Date of Patent: Apr. 5, 2005

(54) CONNECTION STRUCTURE HAVING PIERCED ELASTOMERIC GASKET

(75) Inventors: Gaylen Anderson, Waterdown (CA); Patrice B. Bansa, Mississauga (CA); Antonio Zenga, Mississauga (CA); Charles S. Charron, Oakville (CA); Trygve Husebye, Mississauga (CA)

(73) Assignee: Dahl Brothers Canada Limited, Mississauga (CA)

( * ) Notice: Subject to any disclaimer, the term of this patent is extended or adjusted under 35 U.S.C. 154(b) by 42 days.

(21) Appl. No.: 10/135,850

(22) Filed: May 1, 2002

(65) Prior Publication Data

US 2003/0205281 A1 Nov. 6, 2003

(51) Int. Cl.[7] .................................................. F16L 25/00
(52) U.S. Cl. ........................................ 285/328; 285/917
(58) Field of Search .............................. 785/328, 332.2, 785/917

(56) References Cited

U.S. PATENT DOCUMENTS

| | | | |
|---|---|---|---|
| 2,050,137 A | * | 8/1936 | Walsh ........................ 285/917 |
| 3,467,413 A | * | 9/1969 | Madrelle ..................... 285/328 |
| 3,943,962 A | | 3/1976 | Nagy |
| 4,057,883 A | | 11/1977 | Paptzun et al. |
| 4,068,822 A | | 1/1978 | Richards |
| 4,458,925 A | * | 7/1984 | Raulins et al. ........... 285/332.2 |
| 4,476,891 A | | 10/1984 | Mulas et al. |
| 4,572,239 A | | 2/1986 | Koch et al. |
| 5,735,307 A | | 4/1998 | Charron |
| 5,992,823 A | | 11/1999 | Hung-Lin |

FOREIGN PATENT DOCUMENTS

EP          0607770          7/1994

* cited by examiner

*Primary Examiner*—John Fox
(74) *Attorney, Agent, or Firm*—Bereskin and Paar

(57) ABSTRACT

A connection structure providing a sealed joint between first and second fluid conducting parts has a first seal surface on a first part, a second seal surface on a second part, and an annular elastomeric gasket positioned between the first and second seal surfaces. At least one of the first and second seal surfaces has at least one projection extending from a respective seal surface. The projection is adapted to pierce the elastomeric gasket and abut the opposing seal surfaces upon assembly of the first and second parts at relatively low, hand-tool torque levels.

20 Claims, 16 Drawing Sheets

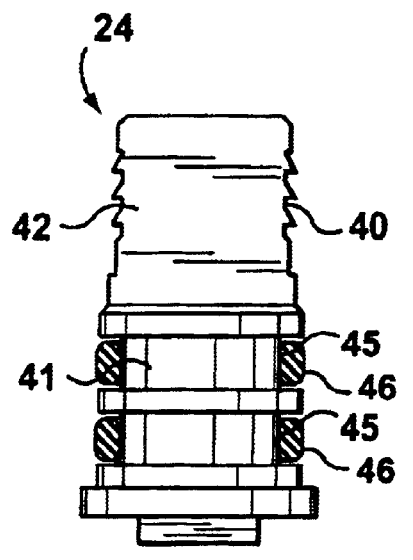
FIG. 4
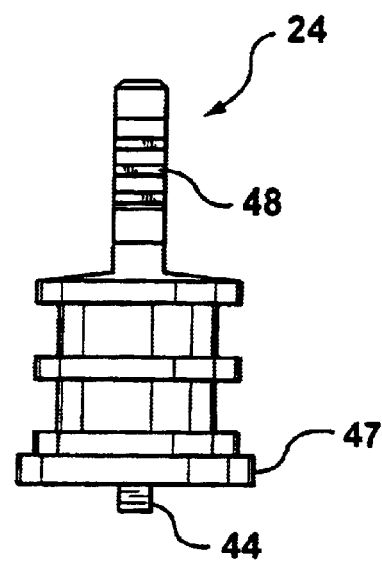
FIG. 5
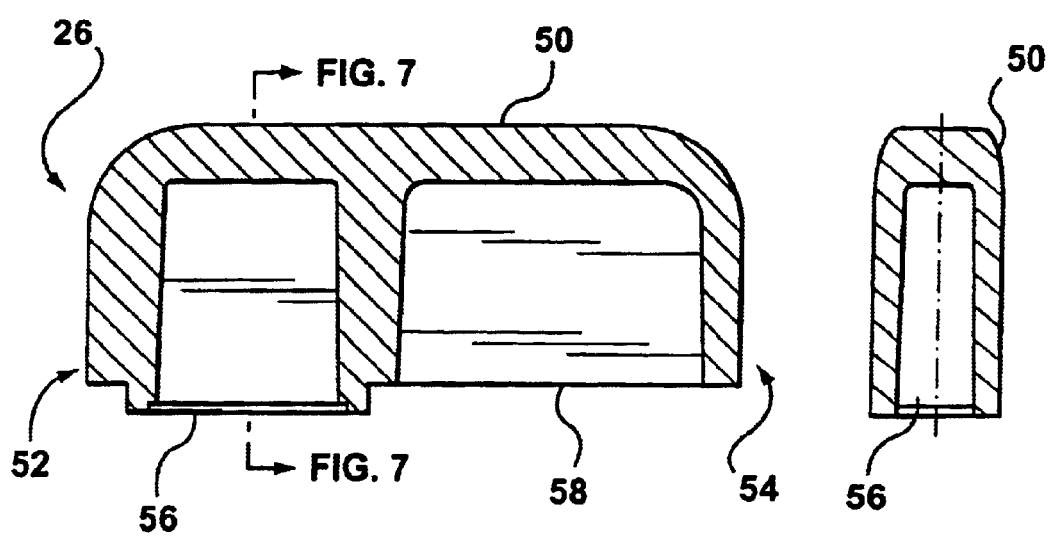
FIG. 6   FIG. 7

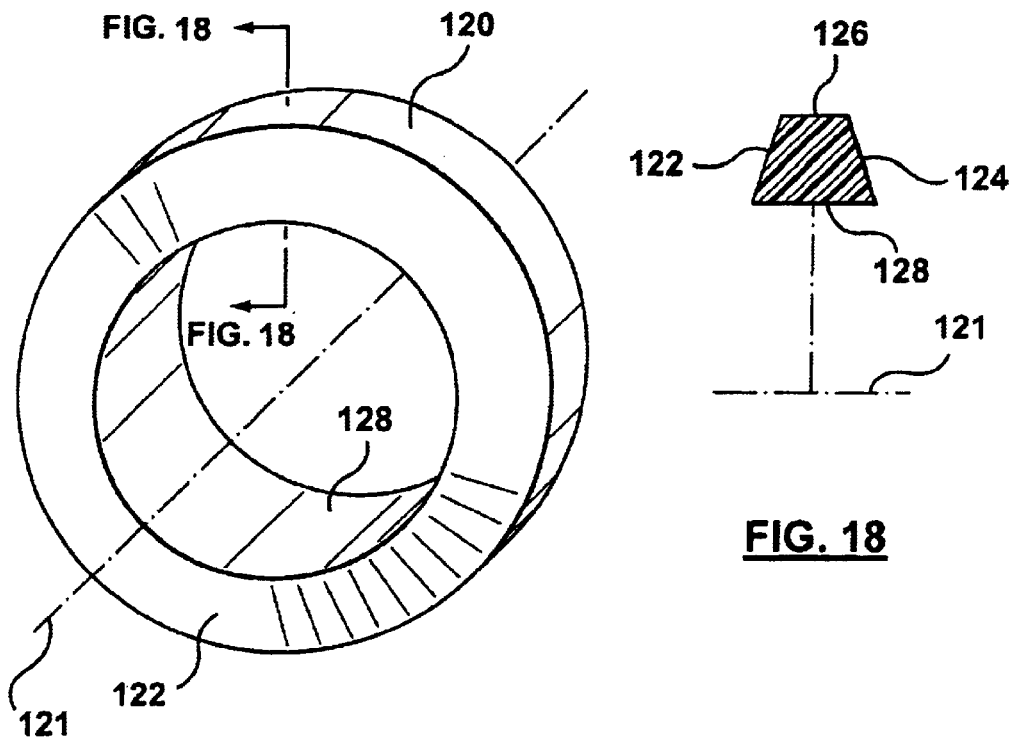
FIG. 17
FIG. 18
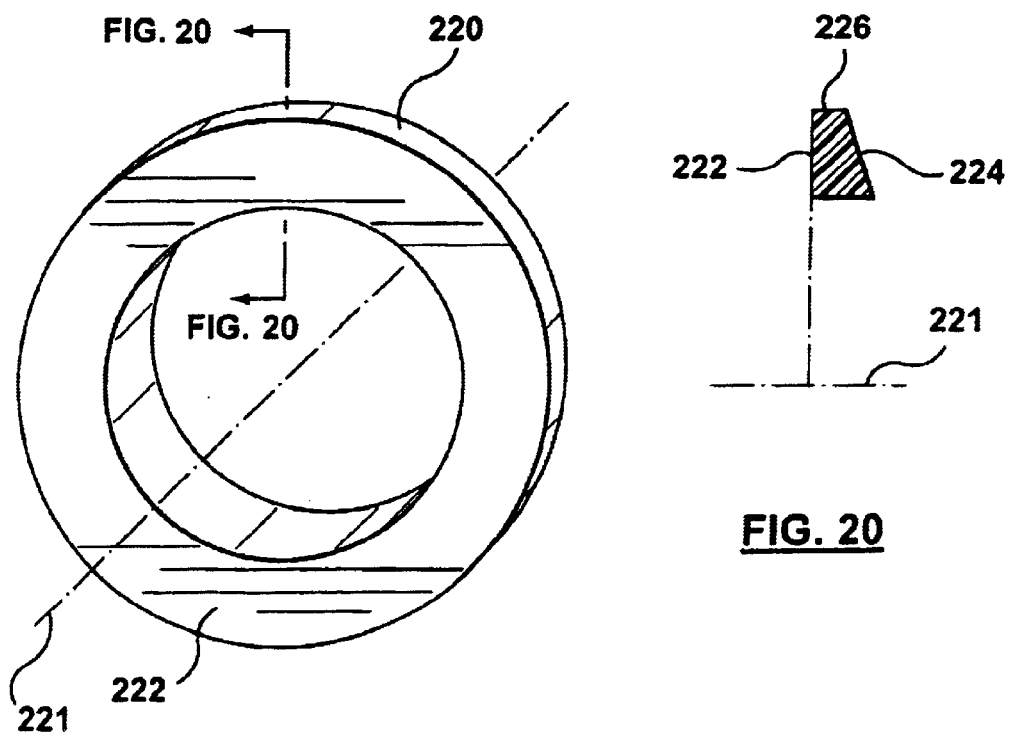
FIG. 19
FIG. 20

CONNECTION STRUCTURE HAVING PIERCED ELASTOMERIC GASKET

FIELD OF THE INVENTION

The present invention relates to valves used in fluid conduit configurations to alternately shut off or allow fluid flow.

BACKGROUND OF THE INVENTION

Providing fluid flow through a conduit is a common requirement. In industrial applications, the flow of air, water or other fluids is often required in the operation of equipment. In residential settings, household plumbing is probably the most common example of fluid flow in a conduit. In these applications, it is often desirable to have the ability to control the flow of fluid at one or more points, through the use of shut-off valves. Such valves can be used simply as an outlet for the fluid, or to isolate downstream elements for such purposes as repair or maintenance.

The conduits to which a valve is to be connected will have a particular configuration defined by the conduit material, size, type of end connections, and arrangement.

Typical conduit materials include copper, plastic, rubber, steel, and composites.

The size of the conduit is generally specified by the inner diameter, but the outer diameter may also be important in certain connection types.

There are a wide variety of end connection types, including socket ends for soldering, male and female thread connections, compression fittings, barb fittings, flare connections, and many others.

The arrangement of the conduit refers to the number and orientation of the conduits to which the valve is to be connected. The arrangement may include a single conduit, at the end of which the valve is to be installed. Alternatively, the arrangement may include two coaxial conduits, requiring a straight valve, or two perpendicular conduits, requiring an angle valve. The arrangement could also consist of three conduits for which a "T" valve is required.

It is readily apparent that the number of unique conduit configurations is considerable. Stocking a comprehensive inventory of valves is therefore a difficult and costly task. For plumbers or pipefitters, it is generally cost prohibitive to carry a large inventory. Plumbers may have sources from which specific valves can be ordered, but receiving the valve is of course delayed by processing and delivery time. Alternatively, plumbers may have access to wholesale suppliers but such suppliers are not usually open in evenings or on weekends. As a result this may cause considerable delay and inconvenience.

The do-it-yourself homeowner will generally not stock any parts. Rather, he or she will typically rely on local hardware or home improvement retailers. These stores are usually open in evenings and on weekends, which is particularly convenient for the do-it-yourself homeowner. However, these retailers are also reluctant to incur the high cost of inventory associated with stocking ready-to-use valves in numerous variety, or to give up the large amount of shelf space which such a variety of valves would require.

It would be advantageous to have a kit of parts from which a valve could be assembled. Such a kit for assembling a valve is disclosed in U.S. Pat. No. 5,735,307 to Charron. The kit includes a valve body and end connectors which fit between the valve body and the conduits to which the valve is to be connected.

However, the valve assembled according to the '307 patent is assembled in a production environment by the manufacturer. The manufacturer therefore achieves inventory cost reductions and convenience by following the teaching of the patent, but such benefits are not experienced by plumbers or do-it-yourself homeowners, or retailers on which they rely.

Furthermore, the kit of parts of the '307 patent is adapted for assembly using industrial equipment and custom fixturing. It is critical that sufficient torque be applied when assembling the valve of the '307 patent, particularly since tightening the connection fittings serves two purposes, namely, pre-loading the seals on the ball of the ball valve, and fixing the connection fittings to the valve housing. To satisfactorily pre-load the seals and to seal the brass-to-brass connection between the fitting and the valve body, a relatively high torque is required. This torque is easily reached with power fastening tools and fixtures designed to hold the valve body during tightening, without damaging the valve. However, since a user in the field cannot be expected to have specialized equipment for tightening of the connection fittings, offering the kit of parts of the '307 patent to such a user is of no benefit Furthermore, factory assembly of the parts of the '307 patent permits leak testing of the valve open/close operation at the factory. Since the assembly of the valve core is completed by assembly of the connection fittings, providing the kit of parts of the '307 patent to a user in the field would eliminate the ability to test the valve operation prior to final installation of the valve.

What is required is a kit of parts from which a valve for connection with any of a wide variety of conduit configurations can be assembled, using ordinary hand tools. The closure member of the valve should be sealed and assembled independatly of the connection fittings to permit factory assembly and leak-testing.

The above and other objects, features, and advantages of the present invention will be apparent in the following detailed description of the preferred embodiment thereof.

SUMMARY OF THE INVENTION

The present invention provides a kit of user-selectable parts from which a valve for connection with any of a wide variety of conduit configurations can be assembled, using ordinary hand tools.

In a first aspect of the invention, a kit of parts for field assembly of a shut-off valve with field selectable connection fittings is provided. The kit of parts includes a valve body, a plurality of connection fittings, and a plurality of gaskets. The valve body has a valve housing with three ports, wherein each of the ports has a longitudinal axis and a first connector end for receiving one of the connection fittings. The valve body has a valve closure member mounted within the valve housing, and a valve handle for moving the valve closure member between open and closed positions. The valve body has internal flow passageways for permitting the flow of fluid among said three ports through said valve closure member, and has a ball valve sealing structure to provide leak-proof operation of the valve closure member when moved between the open and closed positions. The ball valve sealing structure is assembled independent of the connection fittings received in the ports.

The first connector end of each of the ports has a first common configuration with a first seal surface.

Each of the plurality of connection fittings has a second connector end having a second common configuration with a second seal surface. Each of the plurality of connection fittings also has a different adaptor end.

The first connector ends of the ports are adapted to sealingly connect with the second connector ends of the plurality of connection fittings, using one of the plurality of gaskets, the gasket being positioned between the first and second seal surfaces of each of the ports and second connector ends.

In a second aspect of the invention, there is a gasket suitable for use with the kit of parts of the first aspect. The gasket is an annular disc of deformable metal having axially opposed first and second face surfaces and an inner diameter surface and outer diameter surface. The second face surface of the gasket is beveled relative to the second seal surface of the connection fitting such that the cross-sectional width of the gasket is wider at the inner diameter of the gasket and narrower at the outer diameter of the gasket. When a connection fitting is assembled finger tight into a port, the initial area of contact of the second face surface and the second seal surface is limited to a circle on the second face surface of the gasket located adjacent the inner diameter of the gasket.

The second aspect of the invention optionally includes provision for the first face surface of the gasket being beveled relative to the first seal surface. This is provided in one embodiment by beveling the first face surface of the gasket so that in cross section both the first and second face surfaces of the gasket taper inwardly from a widest point at the inner diameter to a narrowest point at the outer diameter of the gasket. Alternatively, this is provided by beveling the first seal surface of the first connector end of the port such that the first seal surface at its inner diameter is nearer to the outer end of the port than at its outer diameter.

The gasket may be of copper material or alternatively of aluminum material.

In a third aspect of the invention, there is an alternative gasket suitable for use with the kit of parts of the first aspect. The gasket is of an elastomeric material. The first seal surface of the port has at least one annular projection so that when tightening the connection fitting into the port, the elastomeric gasket is cut into at least two annular sections by the annular projection. The at least one annular projection makes metal-to-metal contact with the second seal surface, and at least one of the at least two annular sections of the elastomeric gasket is contained in a cavity bounded by the at least one annular projection, the first seal surface, and the second seal surface.

In an alternate embodiment of the third aspect of the invention, the first seal surface of the port has two concentric annular projections so that when tightening the connection fitting into the port, the elastomeric gasket is cut into three annular sections, namely an inner, middle, and outer annular section. The two annular projections make metal-to-metal contact with the second seal surface, and the middle annular section of the elastomeric gasket is contained in a cavity bounded radially by the two annular projections, and axially by the first seal surface and the second seal surface.

The elastomeric gasket of the third aspect of the invention is optionally of polytetrafluoroethylene (PTFE) material.

In a fourth aspect of the invention, a self-contained valve body for field assembly of a shut-off valve with field selectable connection fittings is provided. The valve body has a valve housing with a plurality of ports, each of the ports having a longitudinal axis and a first connector end for receiving a connection fitting. The valve body further has a valve closure member mounted within said the housing, a valve handle for moving the valve closure member between open and closed positions, and internal flow passageways for permitting the flow of fluid among the plurality of ports through the valve closure member. The valve body also has a ball valve sealing structure to provide leak-proof operation of the valve closure member when in, and moving between, the open and closed positions. The assembly and operation of the ball valve sealing structure is independent of the connection fittings received in the ports.

In a fifth aspect of the invention, a connection structure providing a sealed joint between first and second fluid conducting parts is described. The connection structure has a first seal surface on the first part, a second seal surface on the second part, and an annular elastomeric gasket positioned between the first and second seal surfaces. The first and second seal surfaces interact upon assembly of the first and second parts to provide an enclosed annular cavity which traps and is filled with at least a portion of the elastomeric gasket.

In a sixth aspect of the invention, a connection structure providing a sealed joint between first and second fluid conducting parts is described. The connection structure has a first seal surface on the first part, a second seal surface on the second part, and an annular gasket of deformable metal positioned between the first and second seal surfaces. The annular gasket has an inner diameter surface, an outer diameter surface, and axially opposed first and second face surfaces adjacent the first and second seal surfaces, respectively, and the first and second seal surfaces and first and second face surfaces define joint contact surfaces. At least one of the joint contact surfaces is beveled relative to the joint contact surface adjacent the beveled surface, so that the cross-sectional width of the gasket is wider at the inner diameter of the gasket.

BRIEF DESCRIPTION OF THE DRAWINGS

FIG. 4 is a front view of another of the components of the part shown in FIG. 2.

FIG. 5 is a side view of the component shown in FIG. 4.

FIG. 6 is a front view in section of another of the components of the part shown in FIG. 2.

FIG. 7 is a side view in section of the component shown in FIG. 6.

FIG. 17 is a perspective view of a first gasket intended for use with the kit of parts shown in FIG. 1.

FIG. 18 is a cross-section of the gasket of FIG. 17.

FIG. 19 is a perspective view of an alternative gasket intended for use with the kit of parts shown in FIG. 1.

FIG. 20 is a cross-section of the gasket of FIG. 19.

DETAILED DESCRIPTION OF THE INVENTION

Figure 1:
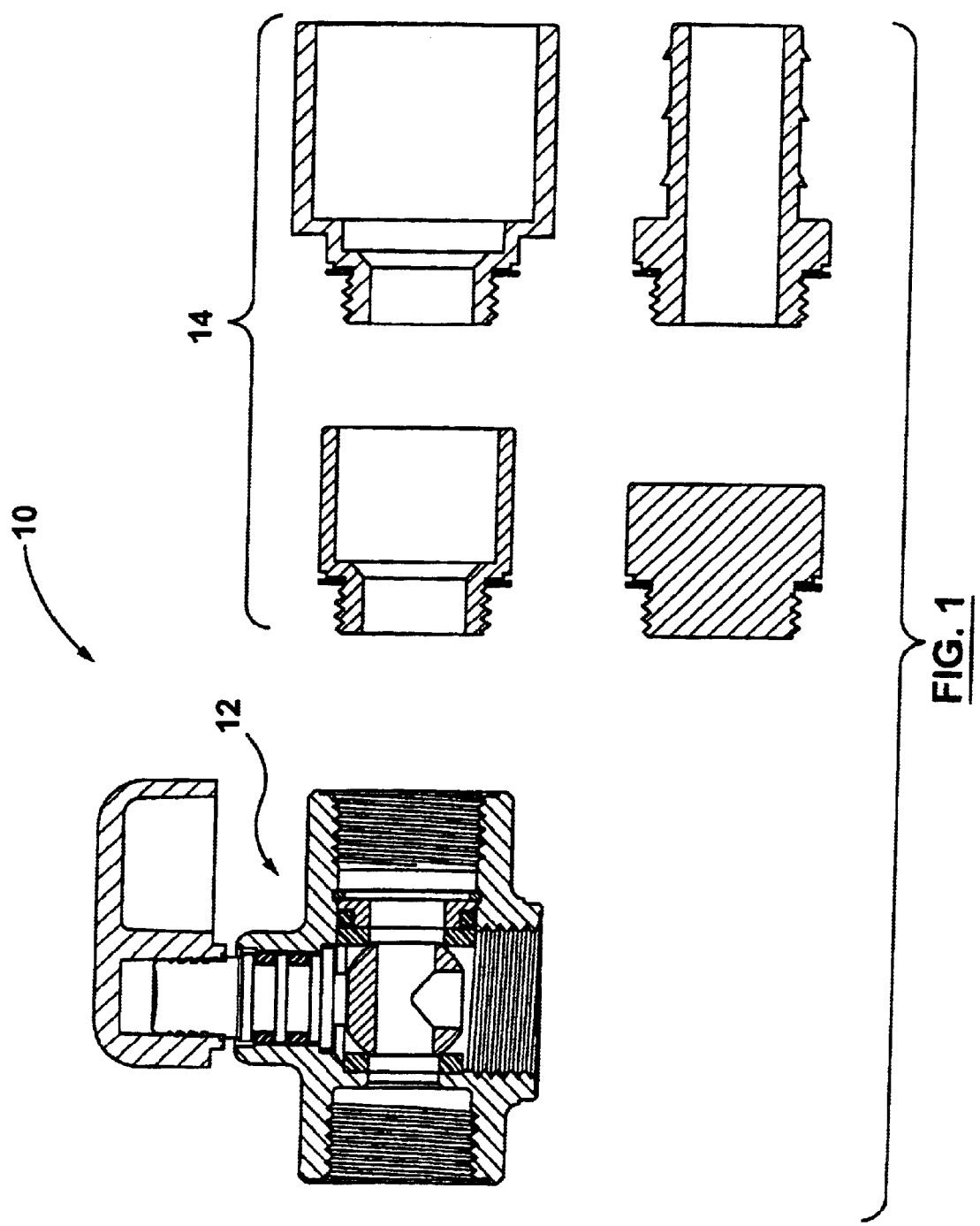
FIG. 1 shows a kit of parts according to one embodiment of the present invention with each of the parts shown in cross-section.

A kit of parts for assembly of a shut-off valve is shown generally at 10 in FIG. 1. The kit of parts 10 comprises a valve body 12 and a plurality of connection fittings 14. All connection fittings 14 have certain portions with a common configuration and certain portions with differing configurations.

Figure 2:
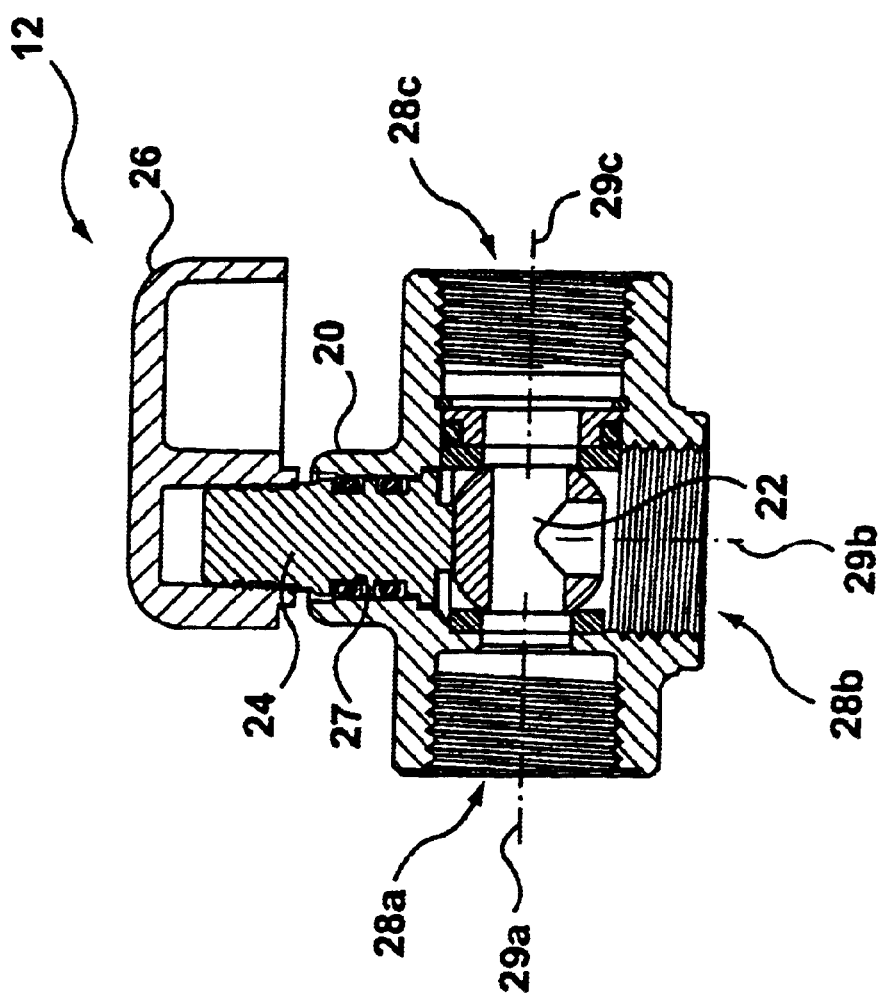
FIG. 2 shows one of the parts of the kit of FIG. 1 in more detail.

Referring now to FIG. 2, valve body 12 comprises a valve housing 20 having a valve closure member 22. Valve body 12 further comprises a spindle 24, valve handle 26, and three ports 28a, 28b, and 28c. The 3 ports have a common configuration and can accept any of the parts 14 of the kit of parts 10.

Figure 3:
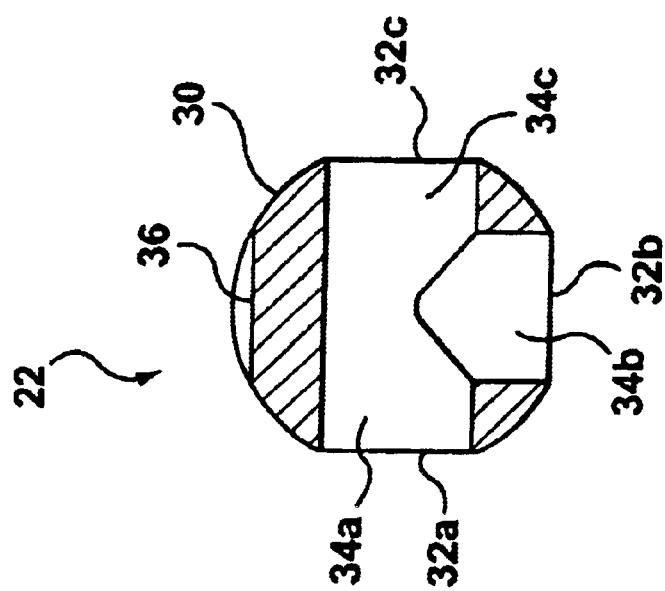
FIG. 3 is a cross-sectional view of one of the components of the part shown in FIG. 2.

As shown in FIG. 3, valve closure member 22 comprises a sphere 30 as is used in what is commonly known as a "ball valve", but it is to be appreciated by one skilled in the art that any known valve closure member can be used to carry out the present invention.

Sphere 30 comprises three openings 32a, 32b, and 32c leading to channels 34a, 34b, and 34c, respectively. Openings 32a and 32b are disposed 90° apart on the surface of sphere 30, and opening 32c is disposed 180° and 90° from openings 32a and 32b, respectively. The three channels 34a, 34b, and 34c intersect at approximately the center of sphere 30. An elongate slot 36 is provided in the surface of sphere 30 diametrically opposite opening 32b.

As can best be seen in FIGS. 4 and 5, spindle 24 comprises a shaft 40 having a first cylindrical spindle portion 41 and a second rectangular spindle portion 42. First cylindrical spindle portion 41 has a plurality of grooves 45 in which o-rings 46 are provided. A flange 47 is disposed between first cylindrical spindle portion 41 and a tab 44. Tab 44 is adapted to engage slot 36 of sphere 30, so that rotation of spindle 24 about its longitudinal axis causes corresponding rotation of sphere 30. A plurality of barbs 48 are provided along second rectangular spindle portion 42 of shaft 40, for attachment to valve handle 26.

Valve body 12 further comprises valve handle 26 which can be actuated to effect the rotation of spindle 24. As can be best seen in FIGS. 6 and 7, valve handle 26 comprises a valve lever 50 which has a rectangular cross-section and length suitable to be comfortably grasped by a user. Valve lever 50 has a first lever end 52 and a second lever end 54. A rectangular bore 56 is provided in one longitudinal face 58 of valve lever 50, axially positioned nearer to first lever end 52 then to second lever end 54. Rectangular bore 56 is adapted to receive second rectangular spindle portion 42 of shaft 40 in a press-fit arrangement.

Referring again to FIG. 2, each of the ports 28a, 28b, and 28c is characterized by a longitudinal bore having an axis 29a, 29b, and 29c respectively, and extending inward from the outer surface 21 of valve housing 20 to valve closure member 22. The three ports 28a, 28b, and 28c are disposed 900 apart about valve closure member 22, having port 28b aligned diametrically opposite spindle 24, and ports 28a and 28c aligned opposite each other. This arrangement of the three ports 28a, 28b, and 28c permits assembly of a straight valve, an angle valve, or a "T"-valve, as will be subsequently discussed. A cylindrical bore 27 is provided opposite port 28b and is adapted to sealingly receive first cylindrical portion 41 of shaft 40 of spindle 24.

Figure 8:
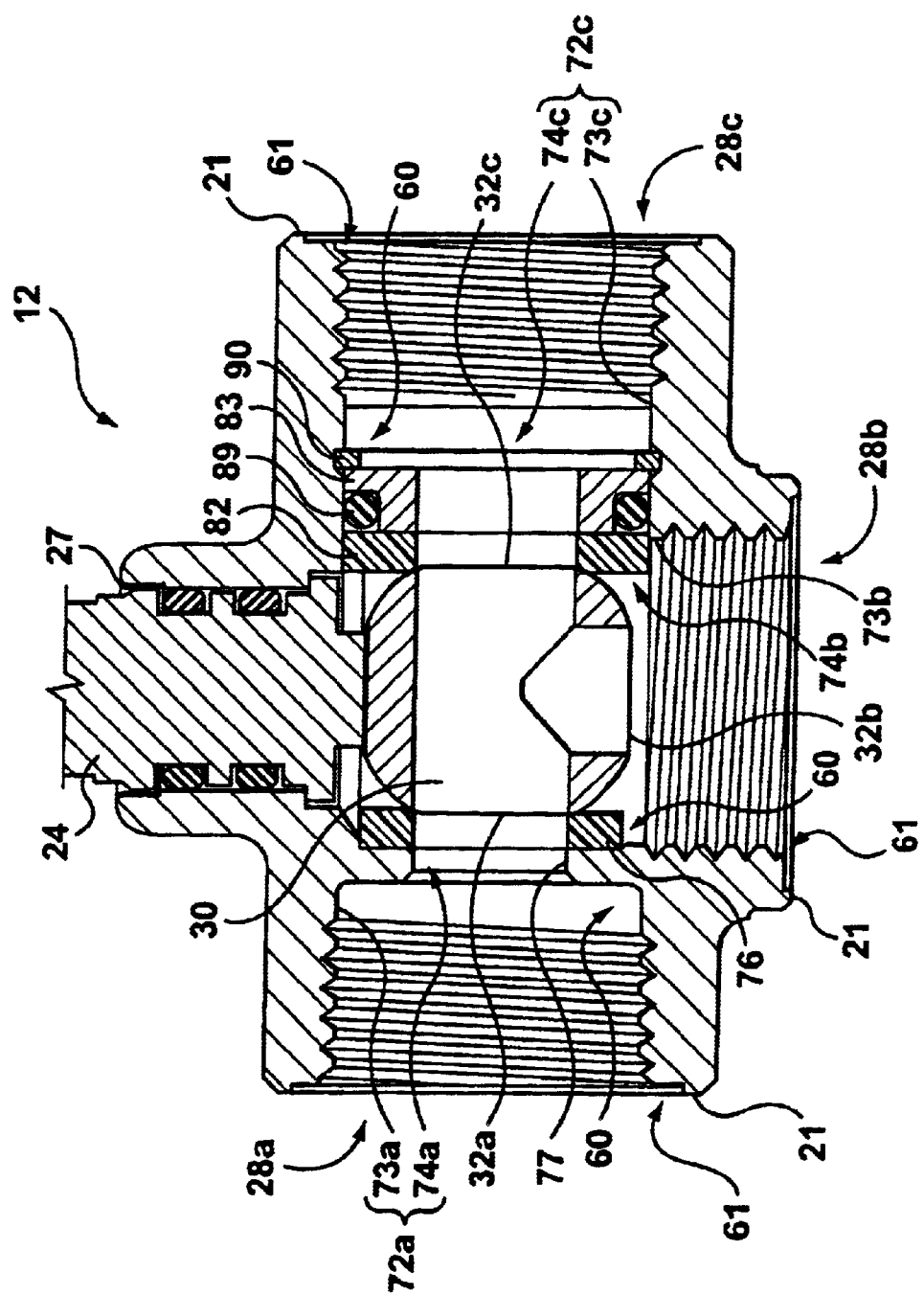
FIG. 8 is a cross-sectional view of a portion of the part shown in FIG. 2 in more detail.

Referring now to FIG. 8, which shows a portion of valve body 12 in greater detail, each port 28 has an inner port end 60 nearest sphere 30 of valve closure member 22, and an outer first connector end 61 nearest the outer surface 21 of valve housing 20.

Inner port configurations 72 are provided at inner port ends 60 of each port 28. Inner port configurations 72 need not be common among the three ports 28. Each inner port configuration 72 comprises a port passageway 73 characterized by a longitudinal bore aligned coaxially with port 28. Each inner port configuration further comprises a valve closure member sealing structure 74 disposed between port passageway 73 and sphere 30 of valve closure member 22. Inner port configurations 72 provide flow passageways which are not more restricted than the passageways defined by the inner diameter of openings 32 in sphere 30 of valve closure member 22.

Figure 9:
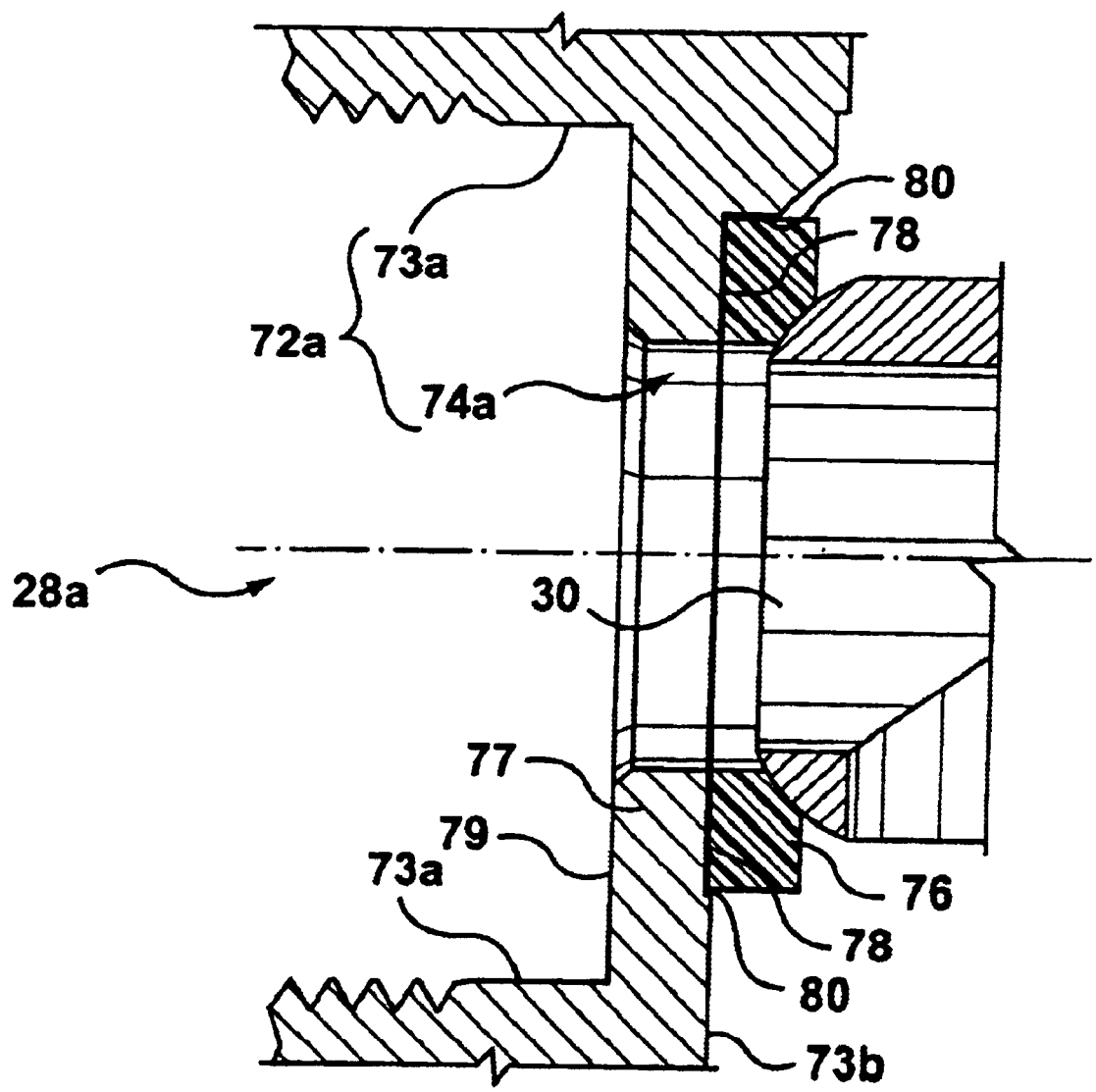
FIG. 9 is an enlarged cross-sectional view of a portion of the part shown in FIG. 8.

Referring now to FIG. 9, sealing structure 74a is provided in port 28a and has an annular seal 76 of polytetrafluoroethylene (PTFE) material disposed between sphere 30 and an annular retaining lip 77. Retaining lip 77 extends radially inward from the inner surface of port passageway 73a, and has inner and outer axially opposed faces 78 and 79, respectively. A substantial cylindrical seal seat 80 extends from inner face 78, coaxial with port 28a, having an inner diameter adapted to accommodate annular seal 76. Seal seat 80 and port passageway 73b of port 28b intersect, so that a portion of seal seat 80 adjacent port 28b is cut away and therefore not visible in the sectional plane of FIG. 9. The axial position of retaining lip 77 along port passageway 73a is such that annular seal 76 is held against the surface of sphere 30 once valve body 12 has been assembled, as will be discussed subsequently.

Figure 10:
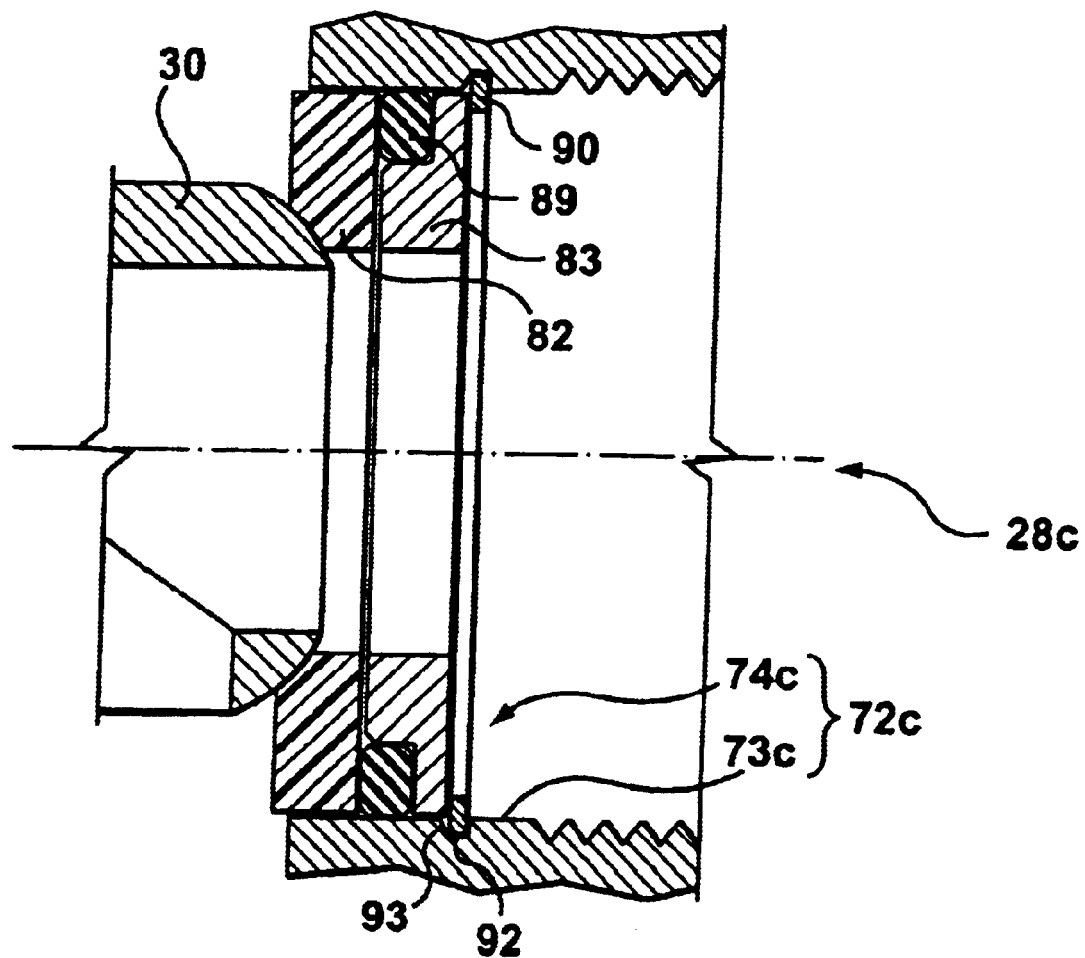
FIG. 10 is an enlarged cross-sectional view of another portion of the part shown in FIG. 8.
Figure 11:
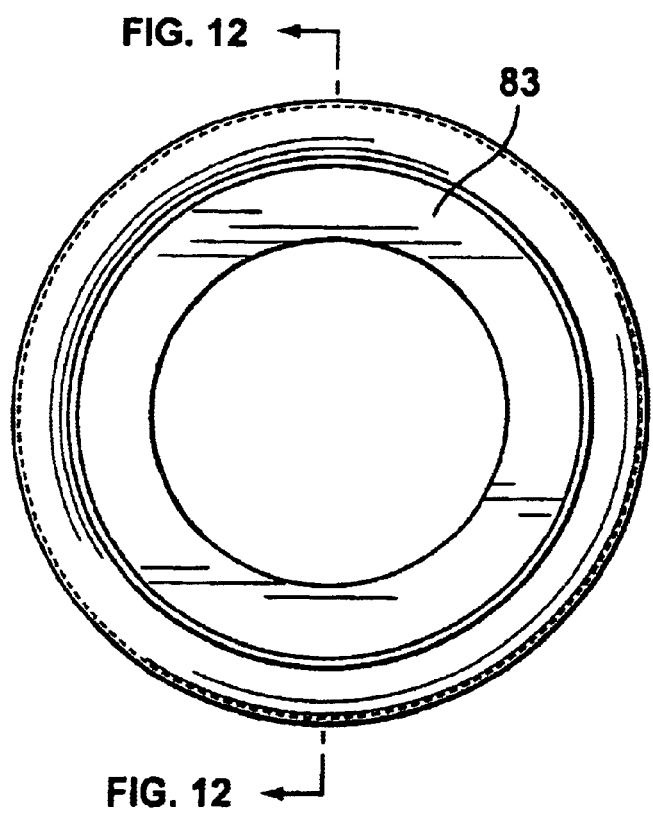
FIG. 11 is a front view of a brass sealing ring intended for use with the kit of parts shown in FIG. 1.
Figure 12:
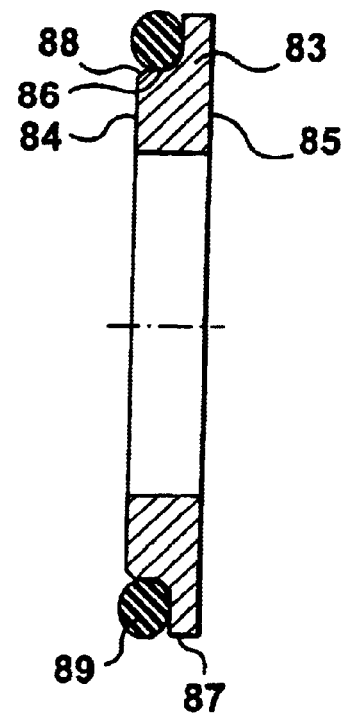
FIG. 12 is a side view in section of the brass ring shown in FIG. 10.

Referring now to FIG. 10, sealing structure 74c is provided at the inner end 60 of port 28c. Sealing structure 74c comprises an annular seal 82 of PTFE material disposed between sphere 30 and a brass sealing ring 83. As best seen in FIGS. 11 and 12, brass sealing ring 83 has inner and outer axially opposed faces 84 and 85. The outer diameter surface of sealing ring 83 is stepped so that a first cylindrical portion 86 having a smaller outer diameter is adjacent inner face 84, and a second cylindrical portion 87 having a larger outer diameter is adjacent outer face 85. A chamfer 88 is provided at the corner of first cylindrical portion 86 and inner face 84, to facilitate assembly of an o-ring 89 which is provided on first cylindrical portion 86.

Referring again to FIG. 10, sealing structure 74c further comprises an internal retaining clip 90 which fits into an annular groove 92 provided in the inner surface of passageway 73c. Annular groove 92 has a bevelled inner radial wall 93 so as to increase the axial width of groove 92 at the inner surface of port passageway 73c and thereby facilitate assembly of retaining clip 90. Internal retaining clip 90 contacts the second face 85 of sealing ring 83 when assembled, and is provided at an axial position such that valve body 12 may be satisfactorily assembled using the following procedure.

Valve body 12 is assembled by first installing spindle 24 into valve housing 20. Spindle 24 is installed by using port 28b for access, and inserting rectangular portion 42 of shaft 40 through cylindrical bore 27 of valve housing 20. Spindle 24 is pushed through cylindrical bore 27 until flange 47 butts up against the inner end of cylindrical bore 27. At this point valve handle 26 can be assembled by aligning bore 56 with rectangular portion 42 and pressing handle 26 on shaft 40 while holding shaft 40 in position relative to housing 20. Tab 44 extending from shaft 40 is then aligned so the longitudinal axis of tab 44 is parallel to axes 29a and 29c of ports 28a and 28c respectively.

Next, annular seal 76 is seated in cylindrical seal seat 80 of retaining lip 77, using port 28c for access. Sphere 30 is then installed through port 28c, and is positioned against seal 80 ensuring that slot 36 of sphere 30 engages tab 44 of spindle 24. Again using port 28c for access, annular seal 82 is then positioned against sphere 30 so that it surrounds opening 32c. O-ring 89 is then positioned against annular seal 82, and brass ring 83 is then inserted so that chamfer 88 of brass ring 83 contacts the inner diameter of o-ring 89. Inner face 84 of brass ring 83 is then pressed through o-ring 89, using chamfer 88 to guide o-ring 89 into position on first cylindrical portion 86 of brass ring 83. The valve is then pre-loaded by pressing the outer face 85 of brass ring 83 axially towards retaining lip 77, and locking the assembly in place by inserting internal retaining clip 90 into groove 92.

This provides a fully functional pre-assembled valve body which is ready for use by a plumber, pipefitter, or do-it-yourself homeowner. Assembly of the valve body in a manufacturing environment enables the valve body to have the same level of quality associated with fully assembled ready-to-use valves, and yet offer the convenience of a user-configurable valve. The user need only select appropriate connection fittings 14 and install these fittings in the corresponding ports 28.

Figure 13:
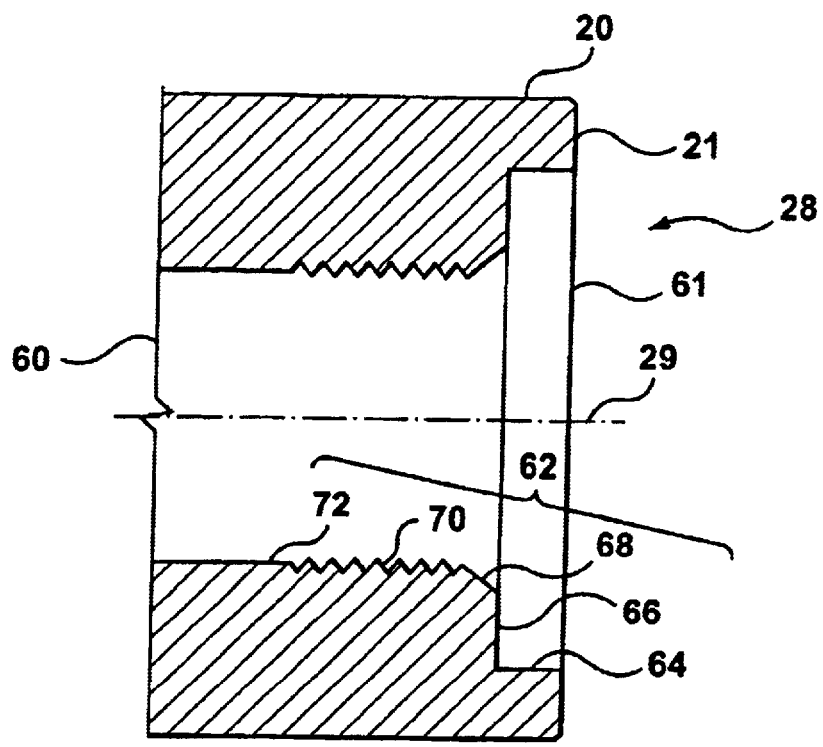
FIG. 13 is a cross-sectional view of another portion of the part shown in FIG. 2 in more detail.

Referring now to FIG. 13, each port 28 has an inner port end 60 nearest valve closure member 22, and an outer first connector end 61 nearest the outer surface 21 of valve housing 20. First connector end 61 of each port 28 has a first common configuration 62, comprising a stepped bore having features along its length described below.

Nearest the outer surface 21 of valve housing 20, first common configuration 62 comprises an internal clearance wall 64 extending parallel to and coaxial with the axis 29 of port 28. Internal clearance wall 64 terminates at a first seal surface 66, which extends radially inward from and substantially perpendicular to clearance wall 64. Thread lead 68, defined by a bevelled surface extending radially inward and axially towards inner port end 60, is disposed about the entrance to an internally threaded bore 70.

Figure 14:
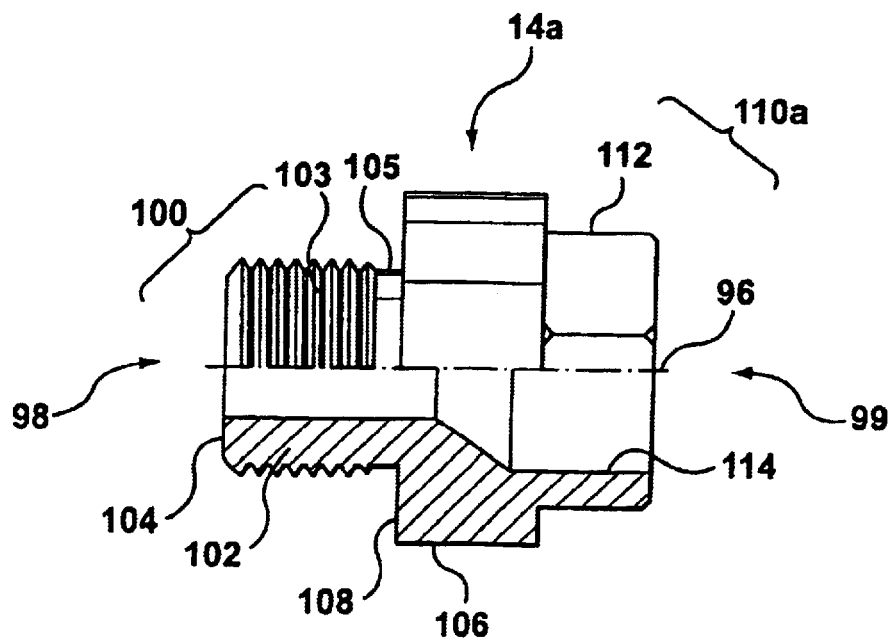
FIG. 14 is a partial cross-sectional view of another of the parts shown in FIG. 1.
Figure 15:
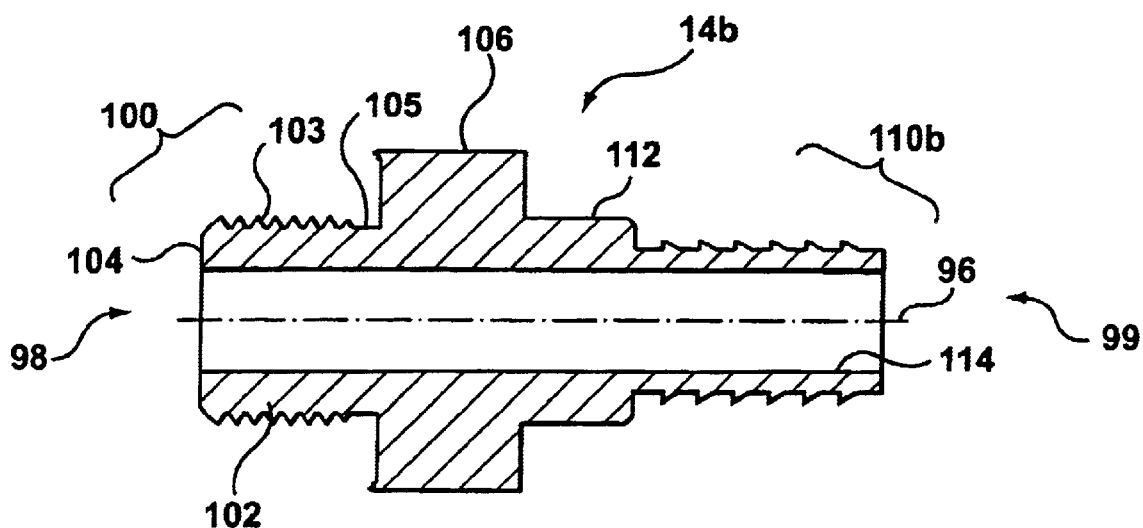
FIG. 15 is a cross-sectional view of another of the parts shown in FIG. 1.
Figure 16:
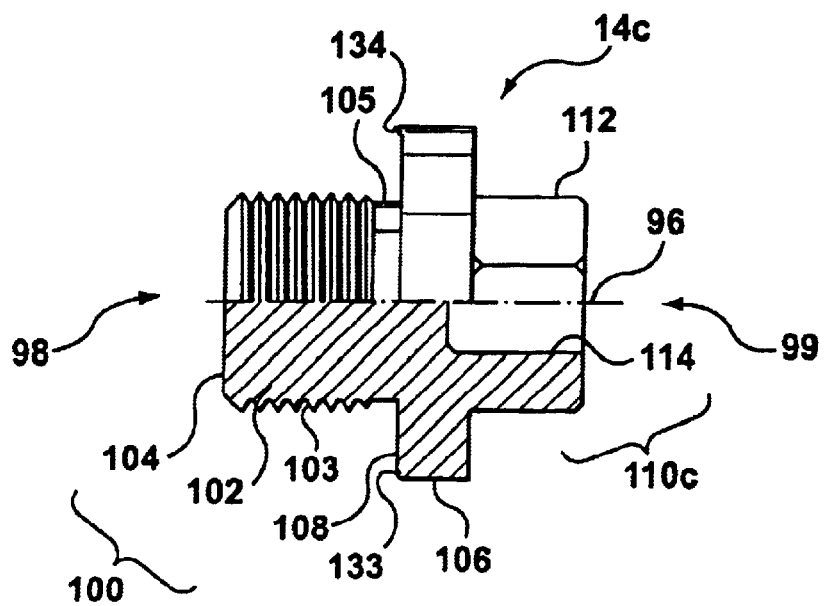
FIG. 16 is a partial cross-sectional view of another of the parts shown in FIG. 1.

The plurality of connection fittings 14 will now be described. A representative sample of the connection fittings 14a, 14b, and 14c is shown in FIGS. 14, 15, and 16, respectively. Preferably the kit of parts 10 would comprise many more than three types of connection fittings, and many multiples of each type, but these three have been illustrated to serve as example. All such connection fittings 14 have a portion having a common configuration. This will be discussed in detail first.

Each connection fitting is elongate having an axis 96 and two axially opposed ends, namely a second connector end 98 and an adaptor end 99. The second connector end 98 of each one of the plurality of connection fittings 14 has a second common configuration 100, adapted to interact with first common configuration 62 of any one of ports 28 of valve housing 20. The second common configuration 100 preferably comprises a first cylindrical portion 102 coaxial with axis 96, having a male threaded portion 103 and an undercut portion 105. Male threaded portion 103 mates with internal threaded portion 70 of first connector end 61. Leading annular surface 104 is provided on one face of first cylindrical portion 102, and is defined by an annular surface disposed perpendicular to and coaxial with axis 96, extending radially inward from the outer diameter of first cylindrical portion 102 to an inner diameter which is not less than the diameter of opening 32 in sphere 30. The combined axial length of male threaded portion 103 and undercut portion 105 is sized to permit assembly of connection fitting 14 in port 28, as described in greater detail subsequently.

The second common configuration 100 further comprises a second cylindrical portion 106 coaxial with axis 96, and adjacent to first cylindrical portion 102, and axially opposite to leading annular surface 104. Second cylindrical portion 106 has an outer diameter greater than that of first cylindrical portion 102, but less than the internal diameter of clearance wall 64. The radial surface at the transition in outer diameters between the first cylindrical portion 102 and second cylindrical portion 106 extends substantially perpendicular to axis 96 and defines a second seal surface 108.

The adaptor ends 99 of the plurality of connection fittings 14 do not share a common configuration. Rather, any one adaptor end 99 has an adaptor configuration 110 which varies among the connection fittings 14. Referring again to FIGS. 14, 15, and 16, examples of specific adaptor configurations 110 include a female pipe adaptor configuration 14a (FIG. 14), a male barb adaptor configuration 14b (FIG. 15), and a plug configuration 14c (FIG. 16). Other adaptor configurations (not shown) include configurations for compression fittings, hose connections, flare connections, crimp connections, and threaded pipe connections and any other type of plumbing connection configuration. All of these configurations are well known in the art and may be included in the variety of adaptor configurations 110 provided on the adaptor ends 99 of the plurality of connection fittings 14.

Preferably, any one adaptor configuration 110 is provided with parallel diametrically opposite lands 112 along the outer surface of adaptor end 99. This enables adaptor end 99 to be gripped by a wrench. The parallel lands 112 may comprise a hexagon of sufficient width to accommodate the jaws of a wrench. The arrangement of and distance between the parallel lands 112 may vary between adaptor configurations 110.

Each adaptor configuration 110 is also provided with a particular axial passageway 114. However, in the case of an adaptor acting as a plug, the particular passageway 114 is blind so that the connector when used acts as a plug for a port 28. The configuration of passageway 114 may differ among the various connection fittings 14 to meet the needs of the particular connection. The passageway 114 is the passageway for fluid but depending on the next component of the piping system, passageway 114 may also accept tubing, piping or other structure. The internal wall of axial passageway 114 may be adapted to fit an Allen key for turning, rather than providing lands 112 if desired, as shown in FIG. 16.

Equipped with the kit of parts 10, a user can select the particular connection fittings from the plurality of connection fittings 14 which have adaptor ends 99 with adaptor configurations 110 suitable for connection to the conduits between which the assembled shut-off valve is to be installed.

For example, assume that a shut off valve is required between a copper pipe and plastic hose disposed at 90° relative to each other. An angle valve having one female pipe connection and one barb connection is required. This can be assembled from the kit of parts 10 by selecting fitting 14a for port 28a, fitting 14b for port 28b, and fitting 14c for port 28c.

Once the appropriate connection fittings 14a, 14b, and 14c have been selected from the kit of parts 10, each connection fitting 14a, 14b, and 14c must be assembled to the corresponding ports 28a, 28b, and 28c. According to the present invention, this assembly should produce a leak-proof joint between each connection fitting 14 and each corresponding port 28, using ordinary hand tools to support valve body 12 and tighten connection fitting 14.

It was expected that a satisfactory joint could be assembled by using a gasket as is commonly practiced in the art. Gaskets for connection fittings are typically annular in shape, having axially opposed faces which are flat and perpendicular to the axis of the gasket. The gaskets are typically of an easily deformable metal, such as copper or aluminum, or of an elastomeric material such a polytetrafluoroethylene (PTFE).

When attempting to use such a gasket in assembling the connection fittings 14 to the valve body 12 using ordinary hand tools, it was found that a leak-proof joint could not reliably be achieved. This appeared to be a result of imperfections in the second seal surface 108 of the connection fittings 14, particularly at the outer circumference of second seal surface 108. As seen in FIG. 16, these imperfections consist of nicks 133 caused by transporting or handling the plurality of connection fittings 14, and/or raised imperfections 134 resulting from build-up during the plating process. Nicks 133 may leave gaps in the joint through which fluid can leak. Raised imperfections 134 tend to gouge and score adjacent gasket surfaces during tightening, leaving troughs through which fluid can leak.

In the present invention these problems have been overcome by using modified gaskets and seal surfaces as described below.

Figure 30:
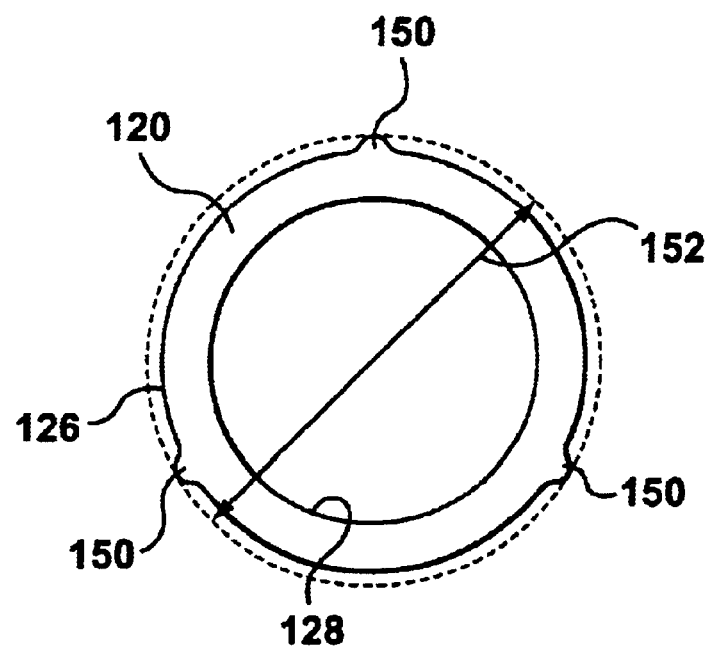
FIG. 30 is a front view of the gasket of FIG. 17 showing optional features.

In a first embodiment the connection is made using a gasket 120. Referring now to FIG. 17, gasket 120 comprises an annular disc of deformable metal such as copper or aluminum, having an axis 121. The inner diameter surface 128 of gasket 120 is sized to fit over first cylindrical portion 102 of the connection fitting 14. The outer diameter surface 126 of gasket 120 is sized to fit within clearance wall 64 of port 28. As best seen in FIG. 30, the outer surface 126 of gasket 120 optionally comprises a plurality of radially outward extending projections 150 spaced equally about the circumference of outer surface 126. The outer diameter 152 on which the radially outermost points of projections 150 lie is sized to provide a press-fit assembly of gasket 120 in clearance wall 64 of port 28. This permits pre-assembly of gasket 120 in valve body 12, thereby ensuring the, presence and concentric positioning of gasket 120 in port 28 during assembly of connection fitting 14.

Referring again to FIG. 17, gasket 120 further comprises a first face surface 122 and a second face surface 124 axially opposed to one another. When the joint formed by connecting one of the plurality of the connection fittings 14 to one of the ports 28 is finger tight, first face surface 122 of gasket 120 is in contact with first seal surface 66 of valve housing 20, and defines a first joint interface 130 (FIG. 21), and second face surface 124 of gasket 120 is in contact with second seal surface 108 of second connector end 98, and defines a second joint interface 132. This is best seen in FIG. 21.

Figure 21:
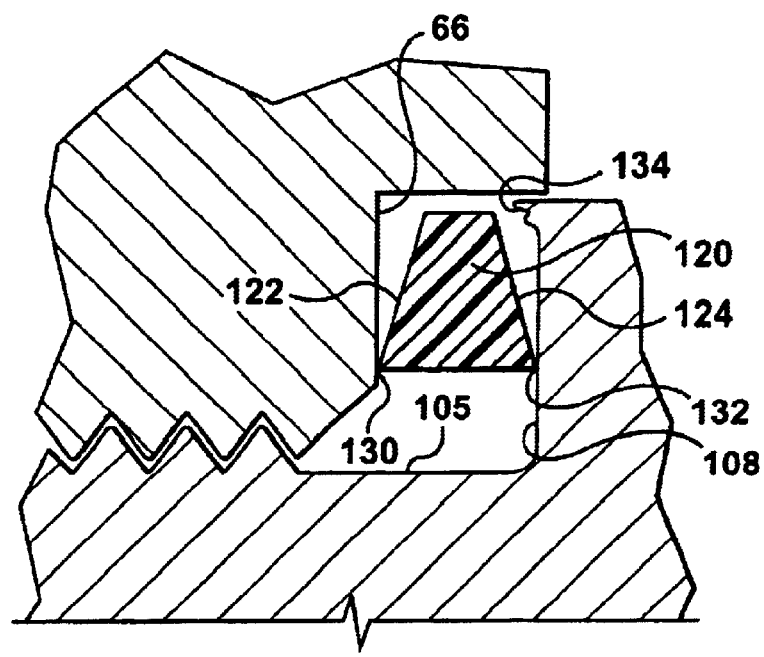
FIG. 21 is a cross-sectional view of a portion of two parts of FIG. 1 and the gasket of FIG. 17 shown in an assembled but pre-tightened state.

To achieve a desired seal in the embodiment of FIG. 21, the first and second face surfaces 122 and 124 of gasket 120 are bevelled, rather than perpendicular to the axis 121 of gasket 120. This is best seen in FIG. 18. The bevelled first and second face surfaces 122 and 124 are disposed such that the outer diameter surface 126 is narrower than the inner diameter surface 128 of gasket 120, and the cross-sectional profile of gasket 120 is symmetrical about an axis 129 extending perpendicular to axis 121 through the center of the cross-section of gasket 120.

As is best seen in FIG. 21, the pre-tightened first and second joint interfaces 130 and 132 have minimal contact surface area, approximating point contact when viewed in cross-section, or line contact when viewed axially. Furthermore, clearance is provided between second face surface 124 of gasket 120 and raised imperfections 134 extending from second seal surface 108.

Upon application of a tightening torque to adaptor end 99 of the connection fitting 14, connection fitting 14 advances axially and places an axial load on gasket 120. This axial load causes deformation of gasket 120, characterized by a flattening of bevelled first and second gasket faces 122 and 124 at the first and second joint interfaces 130 and 132, so that the flattened portions of bevelled first and second gasket faces 122 and 124 lie in flush contact with first and second seal surfaces 66 and 108.

Figure 22:
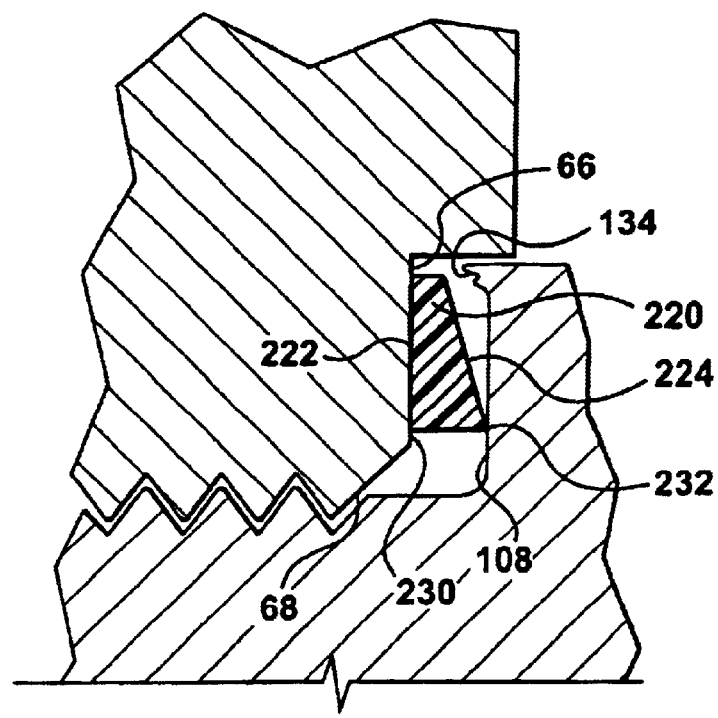
FIG. 22 is a cross-sectional view of a portion of two parts of FIG. 1 and the gasket of FIG. 19 shown in an assembled but pre-tightened state.

On another embodiment of the gasket best seen in FIGS. 19, 20, and 22, a gasket 220 is used to achieve a reduction in surface area of pre-tightened second joint interface 232 only, and to provide clearance between raised imperfections 134 and second gasket face surface 224. First face surface 222 of gasket 220 is aligned perpendicular to axis 221 of gasket 220 so that first face surface 222 of gasket 220 sits flush against first seal surface 66 when the joint is pre-tightened. As a result, first joint interface 230, defined by contact between first seal surface 66 and first face surface 222 of gasket 220, has a surface area equal to the surface area of first face surface 222.

As best seen in FIG. 22, bevelled second face surface 224 of gasket 220 provides a reduced contact surface area of second joint interface 232, and clearance between raised imperfections 134 and second face surface 224.

Figure 23:
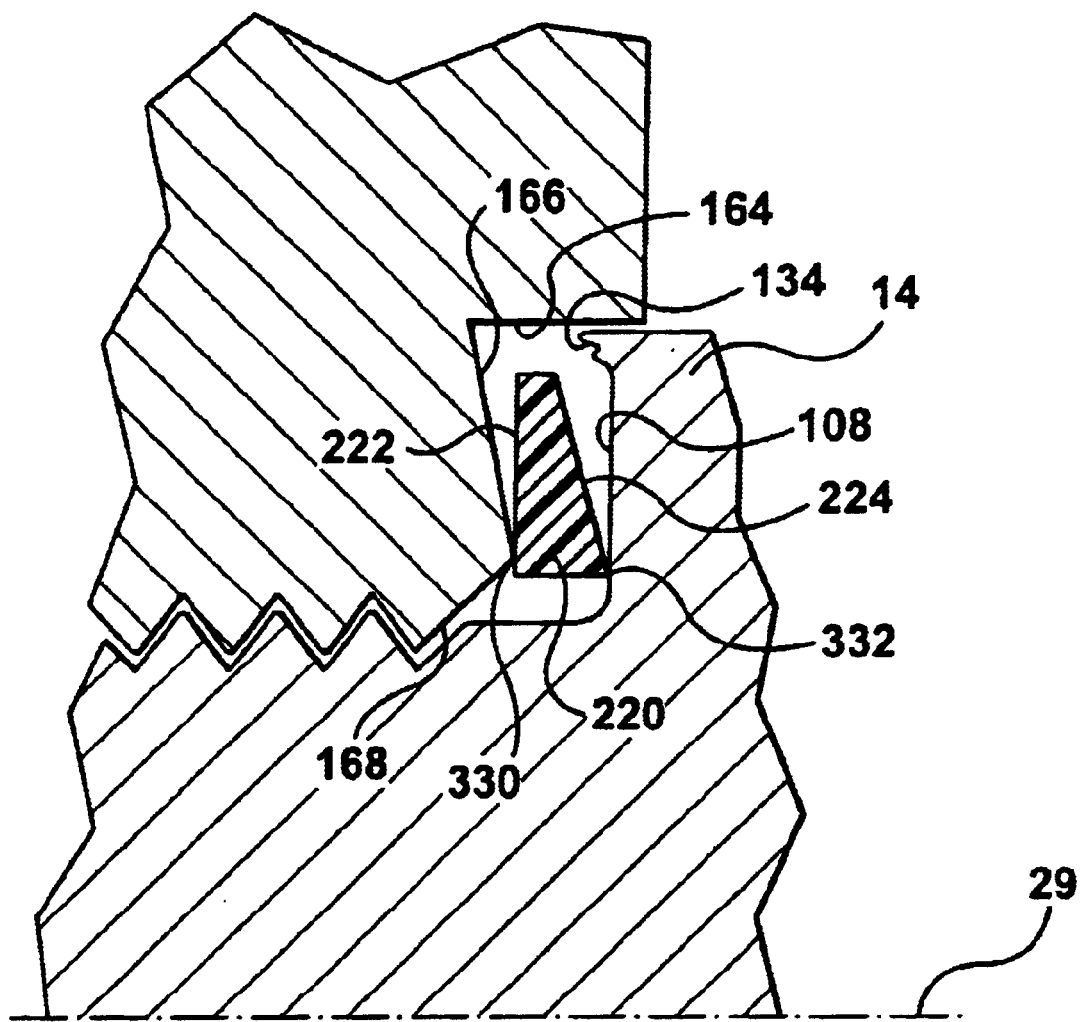
FIG. 23 is a cross-section similar to FIG. 22 but using an alternate form of one of the parts of FIG. 1.

In yet another embodiment, best seen in FIG. 23, a modified seal surface 166 is provided on valve housing 20. The first seal surface 166 is bevelled relative to first face surface 222 of gasket 220, such that first seal surface 166 slopes deeper away from connection fitting 14 as surface 166 extends from its inner diameter to its outer diameter at clearance wall 164.

In the pre-tightened state, a first joint interface 330 exists at the point of contact between the inner diameter of first seal surface 166 and first a face surface 222 of gasket 220. A second joint interface 332 exists at the point of contact between the inner diameter of second face surface 224 of gasket 220 and second seal surface 108 of connection fitting 14.

Upon tightening, deformation of gasket 220 at second joint interface 332 and clearance between raised imperfections 134 and second face surface 224 of gasket 220 is provided as in the previous embodiment. Deformation of gasket 220 at first joint interface takes the form of a pointed annular depression which mates with and surrounds first seal surface 166 and thread lead 168 in the vicinity where they meet at first joint interface 330. In all these alternatives, contact with the imperfections 164 and resultant damage to the seal is reduced. Because of the minimal area of contact at at least one joint interface, hand tool torque is sufficient to deform the gasket to make a satisfactory seal, while using a deformable metal gasket.

In other applications it may be desirable to exploit the sealing properties of an elastomeric gasket, such as polytetrafluoroethyene (PTFE). Such gaskets are known to provide sealed joints with excellent initial leak-proof properties, but the elastomeric material tends to creep under load which in turn allows the joint to loosen over time, causing leaks.

We have discovered this problem may be overcome by providing a sealing structure which pierces the elastomeric gasket to capture at least a portion of the elastomeric material within an enclosed cavity created by assembly of the joint. With the elastomeric material enclosed within and filling the cavity the material cannot creep.

Figure 24:
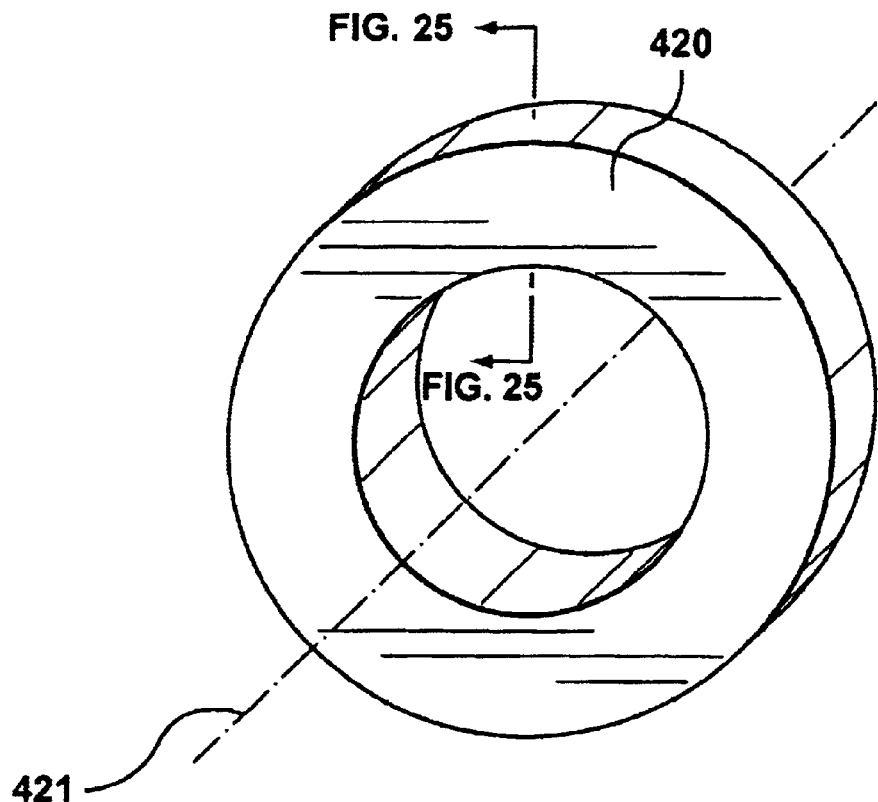
FIG. 24 is a perspective view of an alternative embodiment of a gasket intended to be used with the kit of parts shown in FIG. 1.
Figure 25:
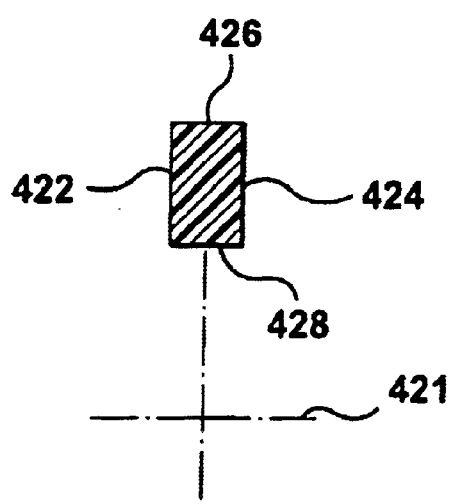
FIG. 25 is a cross-sectional view of the gasket of FIG. 24.
Figure 31:
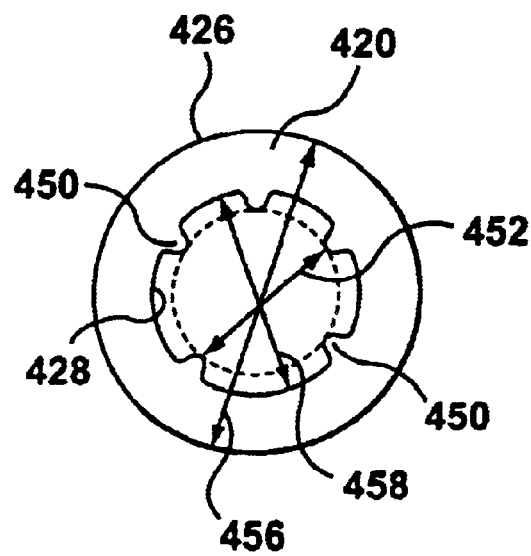
FIG. 31 is a front view of the gasket of FIG. 24 showing optional features.

An elastomeric gasket 420 is shown in FIG. 24. Gasket 420 is an annular disc of elastomeric material, disposed about axis 421. Referring to FIGS. 24 and 25, the gasket 420 has a rectangular profile in cross-section, having a first face surface 422 and an axially opposed second face surface 424, such that face surfaces 422 and 424 are parallel to each other and perpendicular to axis 421. Gasket 420 further comprises an inner diameter surface 428 and outer diameter surface 426. Referring now to FIG. 31, inner diameter surface 428 has a diameter 458 greater than the outer diameter of threaded portion 103 of the connection fitting 14. Outer diameter surface 426 has a diameter 456 less than the diameter of clearance wall 64 of first common configuration 62 of the ports 28. As best seen in FIG. 31, the inner diameter surface 428 of gasket 420 optionally comprises a plurality of radially inward extending projections 450 spaced equally about the circumference of inner diameter surface 428. The inner diameter 452 on which the radially innermost points of radial projections 450 lie is sized to be smaller than the outer diameter of male threaded portion 103 of connection fitting 14, but larger than the outer diameter of undercut portion 105. This permits pre-assembly of gasket 420 on to connection fitting 14 by pushing gasket 420 over and past male threaded portion 103 onto undercut portion 105, thereby ensuring the presence and concentric positioning of gasket 420 in port 28 during assembly of connection fitting 14.

Figure 26:
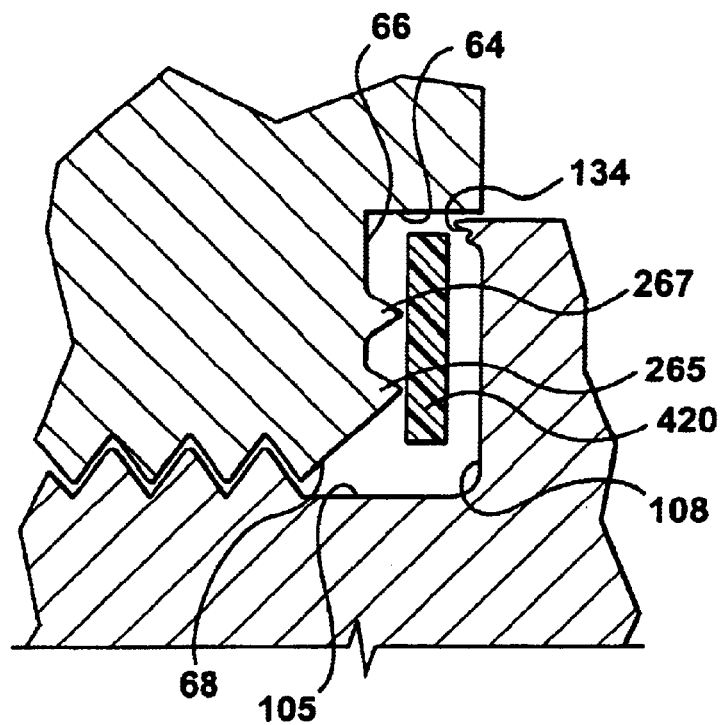
FIG. 26 is a cross-sectional view of a portion of two parts of the kit of FIG. 1 and the gasket of FIG. 24 shown in an assembled but pre-tightened state.

In a first embodiment, using gasket 420, first seal surface 66 of port 28 is modified to have concentric annular axial projections 265 and 267, as seen in FIG. 26. Radially inner annular projection 265 comprises an annular ring of triangular cross-section extending from first seal surface 66, disposed coaxially with axis 29 of port 28, at a diameter slightly greater than the inner diameter of gasket 420. The height of inner annular projection 265 is approximately equal to the thickness of gasket 420. Radially outer annular projection 267 is similar to inner annular projection 265 but is provided at a radial point along first seal surface 66 which is between inner annular projection 265 and the outer diameter of gasket 420.

In the pre-tightened state shown in FIG. 26, gasket 420 will be in contact with the peak of at least one of the inner and outer annular projections 265 and 267 on the first face surface 422 of gasket 420, and raised imperfections 134 on the second face surface 424 of gasket 420.

Figure 27:
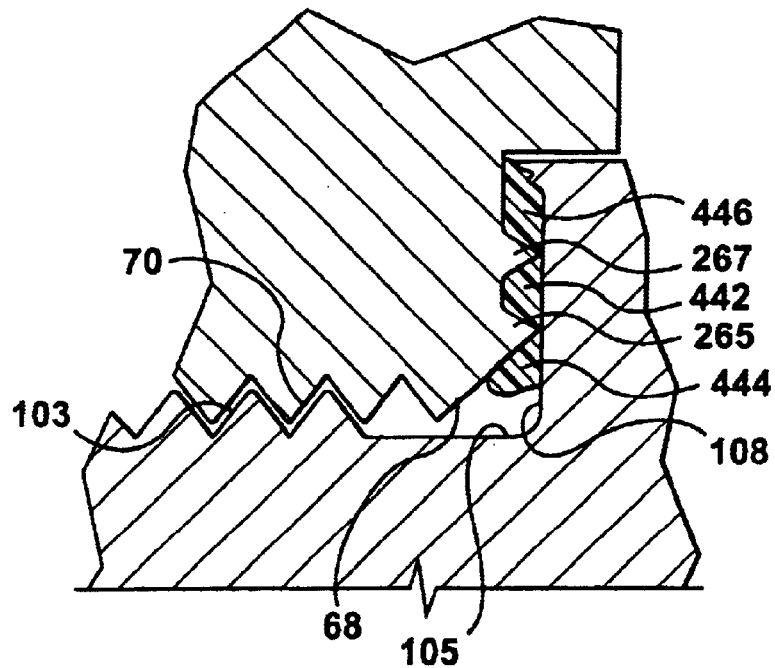
FIG. 27 is a cross-sectional view similar to FIG. 26 but showing parts in the tightened state.

Upon tightening the joint as shown in FIG. 27, the peaks of the inner and outer annular projections 265 and 267 pierce gasket 420 and eventually come into metal-to-metal contact with second seal surface 108. Some deformation of the peaks of annular projections 265 and 267 may occur. Any such deformation contributes to the sealing effect of the joint, and the metal-to-metal contact reduces susceptibility to undesired loosening. In addition, a central annular portion 442 of gasket 420 is captured between facing sides of annular projections 265 and 267, first seal surface 66, and second seal surface 108. This elastomeric material is surrounded on all sides and fills the space. Thus, even though the portion 442 of elastomeric material is in compression it cannot creep as it is confined by the metal-to-metal contact. Radially outer portion 446 of gasket 420 acts as a further seal.

Radially inner portion 444 of gasket 420 is at least partially confined by thread lead surface 68, undercut portion 105, and second seal surface 108. Thread lead 68 and undercut portion 105 are sized to provide a cavity sufficient to accommodate the volume of radially inner portion 444 of gasket 420. However, some clearance is required between the mating male threads 103 and female threads 70, and as a result some creep may occur. For this reason, radially inner portion 444 of gasket 420 may serve as a further seal but is not relied upon.

Figure 28:
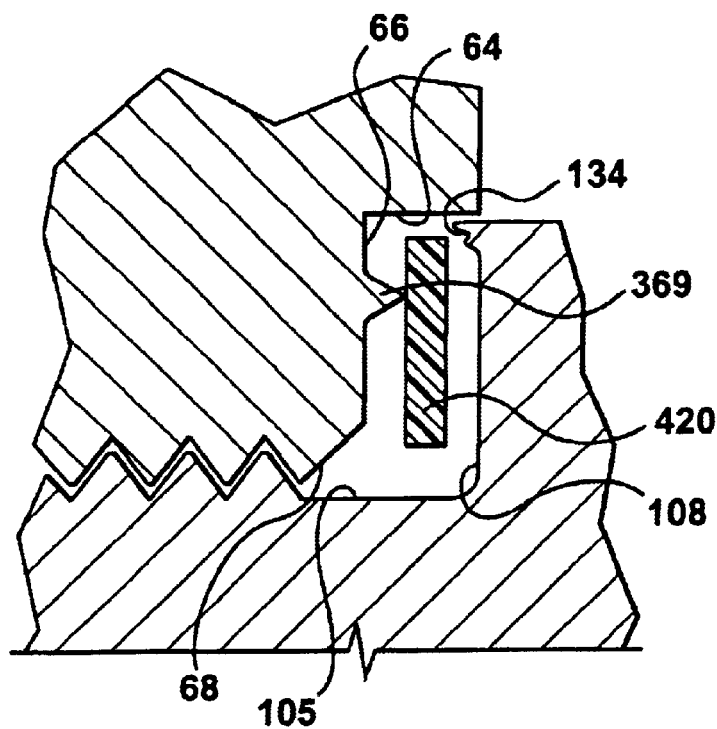
FIG. 28 is a view similar to FIG. 26 but showing parts of the kit of FIG. 1 having an alternative sealing surface.

In another embodiment of the present invention employing elastomeric gasket 420, a single annular projection 369 is provided on a modified seal surface 66. Referring to FIG. 28, annular projection 369 has a triangular cross-section, with a height approximately equal to the thickness of gasket 420. Annular projection 369 is disposed coaxially with axis 29 of the port 28, at a radial position near the midpoint of the inner and outer diameters of first seal surface 66.

In the pre-tightened state (FIG. 28), the first face surface 422 of gasket 420 is in contact with the peak of annular projection 369, and the second face surface 424 of gasket 420 is in contact with raised imperfections 134.

Figure 29:
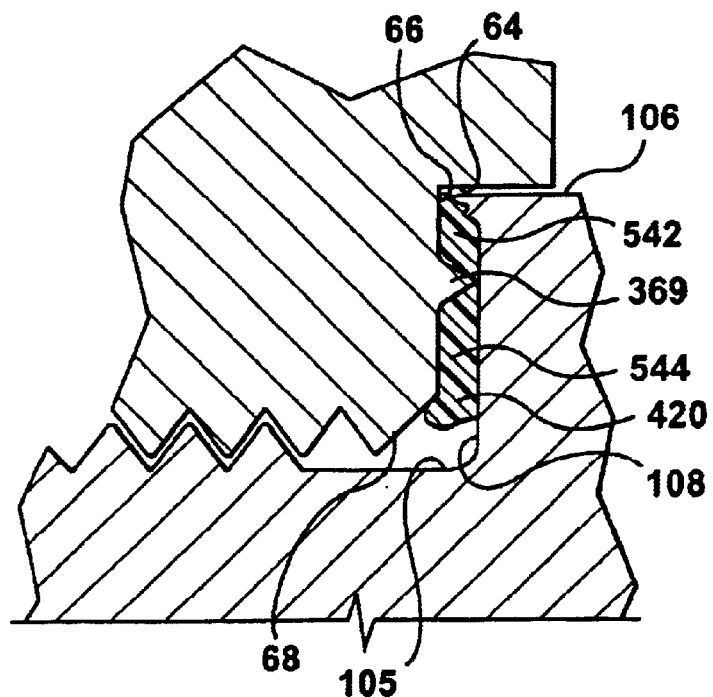
FIG. 29 is a cross-sectional view of the parts of FIG. 28 but showing the parts in the tightened state.

Upon tightening the joint (FIG. 29), the peak of annular projection 369 pierces gasket 420, and eventually comes into metal to metal contact with second seal surface 108. This structure provides a seal and protects against loosening of the joint over time, as in the previous embodiment. Furthermore, the outer annular portion 542 of gasket 420 is captured in a cavity bounded by the outer side face of annular projection 369, first seal surface 66, second seal surface 108, and the close fit between clearance wall 64 and the outer diameter of second cylindrical portion 106. As discussed above, the portion 542 of the gasket 420 is confined on all sides similar to portion 442 and therefore cannot creep which provides a satisfactory seal. As with the previous embodiment the torque available from hand operated tools is sufficient to pierce the gasket 420 and continue to move the connector 14 into the valve housing 20 until metal to metal contact occurs.

While preferred embodiments of the invention have been described herein in detail, it is to be understood that this description is by way of example only, and is not intended to be limiting. The full scope of the invention is to be determined from reference to the appended claims.

What is claimed is:

1. A connection structure providing a sealed joint between first and second fluid conducting parts, said connection structure comprising:

a first seal surface on said first part;

a second seal surface on said second part; and an annular elastomeric gasket positioned between said first and second seal surfaces; and wherein at least one of said first and second seal surfaces includes at least one projection extending from a respective seal surface:

said projection adapted to pierce said elastomeric gasket and abut the opposing seal surface upon assembly of said first and second parts at relatively low, hand-tool torque levels.

2. The connection structure of claim 1, wherein said at least one projection comprises an annular projection with a generally sharp leading edge.

3. The connection structure of claim 2, wherein said annular projection has a generally triangular cross-section.

4. The connection structure of claim 2, wherein said elastomeric gasket is disc shaped with a generally uniform axial thickness, and said annular projection has an axial height generally equal to said thickness of said gasket.

5. The connection structure of claim 2, wherein said annular gasket has a radial extent generally defined by inner and outer gasket diameters, and said leading edge of said at least one projection is defined by an edge diameter intermediate said inner and outer gasket diameters.

6. The connection structure of claim 2, wherein said first and second seal surfaces are adapted to interact upon assembly of said first and second parts to provide an enclosed annular cavity that traps and is filled with at least a portion of said elastomeric gasket.

7. The connection structure of claim 6, wherein said annular projection defines one boundary surface of the enclosed annular cavity.

8. The connection structure of claim 6 comprising two concentric annular projections each having a generally sharp leading edge.

9. The connection structure of claim 8, wherein said annular gasket has a radial extent generally defined by inner and outer gasket diameters, and wherein said leading edges of each projection are defined by respective edge diameters, each respective edge diameter being intermediate the inner and outer gasket diameters.

10. The connection structure of claim 9, wherein said annular cavity is bounded radially by said annular projections and bounded axially by opposing portions of said first and second seal surfaces adjacent said projections.

11. A connection structure providing a sealed joint between first and second fluid conducting parts, said first and second parts adapted to be assembled along coaxial engagement portions defining an axial direction and a radial direction perpendicular to the axial direction, said connection structure comprising:

a first seal surface on said first part;

a second seal surface on said second part;

an annular elastomeric gasket positioned between said first and second seal surfaces; and wherein said first and second seal surfaces include opposing annular compression surfaces and at least one of said first and second seal surfaces includes at least one annular projection extending from and axially proud of a respective one of said compression surfaces, said compression surfaces adapted to bear against and compress said gasket and said at least one annular projection adapted to cut through said elastomeric gasket and abut the opposing seal surface upon assembly of said first and second parts at relatively low, hand-tool torque levels.

12. The connection structure of claim 11, wherein said opposing compression surfaces are disposed in a generally radially oriented plane.

13. The connection structure of claim 12, wherein said first part has a first engagement portion with an entry end for receiving said second part, and a distal end opposite the entry end, and wherein said first seal surface comprises a shoulder extending radially outwardly from said entry end.

14. The connection structure of claim 13, wherein said second part has a second engagement portion with an insertion end for inserting into said entry end of said first engagement portion of said first part, and a trailing end opposite the insertion end, and wherein said second seal surface comprises a flange extending radially outwardly from said trailing end.

15. The connection structure of claim 14, wherein said first engagement portion comprises a female thread and said second engagement portion comprises a male thread for engaging said female thread.

16. The connection structure of claim 15, wherein said first and second parts are adapted to provide clearance between said distal end of said first engagement portion and said entry end of said second engagement portion when said at least one projection abuts said opposing seal surface.

17. The connection structure of claim 11, wherein said first and second seal surfaces interact upon assembly of said first and second parts to provide an enclosed annular cavity that traps and is filled with at least a portion of said elastomeric gasket.

18. The connection structure of claim 17, wherein said elastomeric gasket is disc shaped with a generally uniform axial thickness, and said at least one annular projection has an axial height generally equal to said thickness of said gasket.

19. The connection structure of claim 17, wherein said annular gasket has a radial extent generally defined by inner and outer gasket diameters, and said at least one projection has a leading edge defined by an edge diameter intermediate said inner and outer gasket diameters.

20. The connection structure of claim 17, comprising two concentric annular projections, wherein said annular gasket has a radial extent generally defined by inner and outer gasket diameters, and said two annular projections each have a leading edge defined by respective edge diameters intermediate said inner and outer gasket diameters.

* * * * *